United States Patent [19]

Nakajima et al.

[11] Patent Number: 4,955,705
[45] Date of Patent: Sep. 11, 1990

[54] MULTI-LAYERED BACK REFLECTING MIRROR

[75] Inventors: Yuji Nakajima, Tokyo; Katsunori Ishida, Fussa; Masashi Mochizuki, Hoya, all of Japan

[73] Assignee: Hoya Corporation, Tokyo, Japan

[21] Appl. No.: 392,590

[22] Filed: Aug. 11, 1989

[30] Foreign Application Priority Data

Aug. 31, 1988 [JP] Japan .............................. 63-217291

[51] Int. Cl.$^5$ .............................. G02B 5/08; G02B 5/28
[52] U.S. Cl. ........................................ 350/642; 350/278; 350/166
[58] Field of Search ............... 350/164, 166, 278, 601, 350/642, 1.7

[56] References Cited

U.S. PATENT DOCUMENTS

| 2,519,722 | 8/1950 | Turner | 350/166 |
| 4,673,248 | 6/1987 | Taguchi et al. | 350/166 |
| 4,805,989 | 2/1989 | Nakajima | 350/642 |

Primary Examiner—Rodney B. Bovernick
Assistant Examiner—J. P. Ryan
Attorney, Agent, or Firm—Nixon & Vanderhye

[57] ABSTRACT

The present invention relates to a multi-layered back reflecting mirror which comprises a substrate, a dielectric multi-layered film formed on one side of the substrate and a metal or semiconductor film formed on the dielectric multi-layered film and which is superior in freedom from glare, visibility, decorative aspect, productivity, cost, etc.

12 Claims, 9 Drawing Sheets

FIG. I(D)
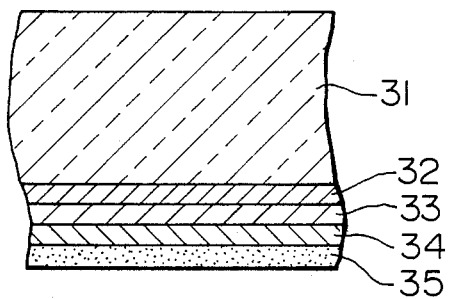
FIG. I(E)
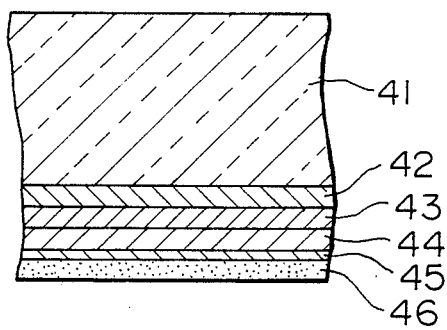

MULTI-LAYERED BACK REFLECTING MIRROR

BACKGROUND OF THE INVENTION

(1) Field of the Invention

The present invention relates to a reflecting mirror and more particularly to a multi-layered back reflecting mirror superior particularly in freedom from glare, visibility, decorative aspect, productivity, cost, etc. The multi-layered back reflecting mirror of the present invention is used mainly as a rearview mirror for automobiles, a mirror with a convex surface that warns drivers against hazards on the road ahead, an ornamental mirror, etc. and further has other wide applications.

(2) Description of the Prior Art

As an example of the multi-layered back reflecting mirror comprising a glass substrate, a dielectric multi-layered film formed at the back side of the glass substrate and a metal film formed on the dielectric multi-layered film, Japanese Patent Application Kokai (Laid-Open) No. 212704/1985 discloses a multi-layered back reflecting mirror wherein a dielectric multi-layered film is formed by laminating a high refractive index material layer having an optical thickness of $\lambda/4$ ($\lambda$ is a wavelength) and a low refractive index material layer having an optical thickness of $\lambda/4$ by turns and further laminating thereon a high refractive index material layer having an optical thickness of $\lambda/2$. Further, Japanese Patent Application Kokai (Laid-Open) No. 212705/1985 discloses a multi-layered back reflecting mirror wherein a dielectric multi-layered film is formed by laminating a high refractive index material layer having an optical thickness of $\lambda/4$ and a low refractive index material layer of an optical thickness of $\lambda/4$ by turns so that the number of the total layers becomes four. Furthermore, U.S. Pat. No. 4,673,248 discloses a multi-layered back reflecting mirror comprising a glass substrate, a low refractive index material layer and a high refractive index material layer arranged in this order.

Japanese Patent Application Kokai (Laid-Open) No. 74005/1988 discloses a multi-layered back reflecting mirror comprising a glass substrate, a dielectric multi-layered film formed at one side of the glass substrate and a light-absorbing film formed on the dielectric multi-layered film, wherein the dielectric multi-layered film is formed by laminating four to eight dielectric layers having alternately differing refractive indices and at least one of these dielectric layers has an optical thickness of $\lambda/2$.

These conventional multi-layered back reflecting mirrors comprising a glass substrate, a dielectric multi-layered film formed at the back side of the glass substrate and a metal film formed on the dielectric multi-layered film, have spectral reflection characteristics as shown in FIG. 2.

In FIG. 2, a curve (a) is the spectral reflection characteristic of the multi-layered back reflecting mirror disclosed in Japanese Patent Application Kokai (Laid-Open) No. 212704/1985. As is clear from the curve (a), in this reflecting mirror, the reflectance is high in a wavelength region from 430 nm to 550 nm and decreases significantly from 550 nm to 700 nm, and the reflected light is bluish. Accordingly, the color balance of the background view provided by the mirror is greatly different from the actual color balance and a red color, in particular, is difficult to recognize, thus impairing the visibility of the mirror.

FIG. 3 shows the spectral luminous efficiency $V'(\lambda)$ of the human eye [curve (1)], the spectral energy characteristic $P(\lambda)$ of an automobile halogen headlight [straight line (2)] and their product $P(\lambda) \times V'(\lambda)$ [curve (3)]. As is clear from FIG. 3, the wavelength of a light emitted from an automobile headlight (halogen lamp) at night and sensible by the human eye lies mainly in a wavelength region of 480–550 nm. In the case of the reflecting mirror disclosed in Japanese Patent Application Kokai (Laid-Open) No. 212704/1985, the wavelength region (430–550 nm) giving a high reflectance in the curve (a) of FIG. 2 coincides fairly well with the above wavelength region of 480–550 nm; accordingly, the mirror's ability to prevent the glare of the headlights of an automobile running behind is not as high as expected.

Also in FIG. 2, a curve (b) is the spectral reflection characteristic of the multi-layered back reflecting mirror disclosed in Japanese Patent Application Kokai (Laid-Open) No. 212705/1985, and a curve (c) is the spectral reflection characteristic of the multi-layered back reflecting mirror disclosed in U.S. Pat. No. 4,673,248. These curves have about the similar pattern as the curve (a). Therefore, it is apparent that these reflecting mirrors have insufficient visibility and insufficient glare prevention, similarly to the aforementioned reflecting mirror disclosed in Japanese Patent Application Kokai (Laid-Open) No. 212704/1985.

Meanwhile, the conventional multi-layered back reflecting mirror disclosed in Japanese Patent Application Kokai (Laid-Open) No. 74005/1988 is superior in visibility and freedom from glare but has drawbacks in that the productivity is low incurring a higher cost because the number of layers of the dielectric multi-layered film is as many as 4–8 and the formation (coating and baking) of the light-absorbing film must be made in a step different from the vacuum deposition step for formation of the dielectric multi-layered film.

SUMMARY OF THE INVENTION

A general object of the present invention is to solve the above mentioned problems of the conventional multi-layered back reflecting mirrors. A definite object of the present invention is to provide a multi-layered back reflecting mirror superior in visibility, freedom from glare, decorative aspect, productivity, cost, etc.

According to the present invention, there is provided a multi-layered back reflecting mirror comprising a substrate, a dielectric multi-layered film formed on one side of the substrate and a metal or semiconductor film formed on the dielectric multi-layered film, the dielectric multi-layered film comprising at least one high refractive index material layer having an optical thickness of $\lambda_0/2$ ($\lambda_0$ is the wavelength of a light used as the reference measurement for design purposes) and at least one low refractive index material layer having an optical thickness of $0.05\lambda_0$ ($\lambda_0/20$) to $0.4\lambda_0$ ($2\lambda_0/5$), the high refractive index material layer existing closer to the substrate relative to the low refractive index material layer, and the low refractive index material layer existing closer to the metal or semiconductor film relative to the high refractive index material layer.

DETAILED DESCRIPTION OF THE INVENTION

Figure 1A:
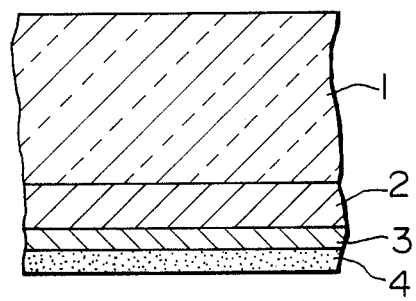
FIGS. 1 (A) to 1 (E) each show on an enlarged scale the sectional view of the essential part of a multi-layered back reflecting mirror of the present invention.

The present invention is described in detail below.

The substrate used in the multi-layered back reflecting mirror of the present invention is preferably a transparent substrate but may be a non-transparent substrate. The substrate preferably has a plane at both sides or a convex or concave surface at least at one side (e.g. a plano-concave plate, a plano-convex plate, a concave-convex plate, a double-concave plate, a double-convex plate). As the preferable material of the substrate, there are mentioned glass and plastics, but other materials can be used as well.

In the multi-layered back reflecting mirror of the present invention, there are provided, on one side of the substrate, a dielectric multi-layered film and, on the dielectric multi-layered film, a metal or semiconductor film.

The dielectric multi-layered film is described. This dielectric multi-layered film comprises at least one high refractive index material layer and at least one low refractive index material layer. The high refractive index material layer is preferably made of a high refractive index material having a refractive index of 1.9–2.4. As such a high refractive index material, there is appropriately used an oxide such as SiO, $TiO_2$, $Ta_2O_5$, $ZrO_2$, $HfO_2$ or the like, a sulfide such as ZnS or the like, or a mixture thereof. The low refractive index material layer is preferably made of a low refractive index material having a refractive index of 1.3–1.8. As such a low refractive index material, there is appropriately used an oxide such as $SiO_2$, $Al_2O_3$ or the like, a fluoride such as $MgF_2$, $CeF_3$ or the like, or a mixture thereof. However, the refractive indices of the high refractive index material and the low refractive index material are not restricted to the above ranges. For example, $Al_2O_3$ (refractive index=1.63) or $CeF_3$ (refractive index=1.63) both mentioned above as a low refractive index material can be used as a high refractive index material as long as there is used a low refractive index material having a refractive index lower than 1.63.

The optical thickness of the high refractive index material layer is restricted to $\lambda_0/2$ ($\lambda_0$ is the wavelength of a light used as the reference measurement for design purposes) and that of the low refractive index material layer is restricted to 0 0.05–0.4$\lambda_0$. The reason for the restriction of the optical thicknesses of the two layers to the above ranges is that the restriction allows the resulting reflecting mirror to have a reflection characteristic giving excellent glare prevention and excellent visibility.

The optical thickness of the low refractive index material layer is particularly preferably $\lambda_0/8$ or $\lambda_0/4$.

It is possible to form a high refractive index material layer having an optical thickness of $\lambda_0/2$ by combining a high refractive index material layer having an optical thickness of $\lambda_0/4$ and another high refractive index material layer having an optical thickness of $\lambda_0/4$ and provided adjacent thereto.

In the dielectric multi-layered film constituting the reflecting mirror of the present invention, the relative positions of the high refractive index material layer and the low refractive index material layer are specified. That is, the high refractive index material layer is provided closer to the substrate and the low refractive index material layer is provided closer to the metal or semiconductor film. The reason for specifying the relative positions of the two layers is that such specification allows the resulting reflecting mirror to have a reflection characteristic giving excellent glare prevention and excellent visibility.

In the multi-layered back reflecting mirror of the present invention, the dielectric multi-layered film may consist of three dielectric layers, i.e. the aforementioned high refractive index material layer, the aforementioned low refractive index material layer and an additional low refractive index material layer provided between the substrate and the high refractive index material layer. Similarly to the aforementioned low refractive index material layer, this additional low refractive index material layer is made of a material having a refractive index of 1.3–1.8, selected from, for example, an oxide (e.g. $SiO_2$, $Al_2O_3$), a fluoride (e.g. $MgF_2$, $CeF_3$) or a mixture thereof. These two low refractive index material layers may have same or different refractive indices and therefore may be made of same or different materials.

The optical thickness of the additional low refractive index material layer has no particular restriction but is preferably 0.1–3$\lambda_0$.

The dielectric multi-layered film can be formed by various coating methods including physical coating techniques such as evaporation, sputtering and ion plating, chemical vapor deposition (CVD) techniques and thin-film forming techniques such as one employing an organic coating solution.

Next, there is described the metal or semiconductor film provided on the dielectric multi-layered film of the reflecting mirror of the present invention.

The metal or semiconductor film functions as a reflecting film and has a reflectance of preferably 30% or more, particularly preferably 50–80%. As such a metal or semiconductor film, there is used a single metal or semiconductor such as Cr, Ni, Al, Ag, Co, Fe, Si, Ge or the like, or an alloy containing at least one of these metals or semiconductors. Examples of the alloy include Inconel (consisting of 80% by weight of Ni, 14% by weight of Cr and 6% by weight of Fe and, besides, containing a very small amount of impurities) and chromel (consisting of 80% by weight of Ni and 20% by weight of Cr and, besides, containing a very small amount of impurities).

The metal or semiconductor film can be formed by the same coating methods as used in the formation of the dielectric multi-layered film.

Preferred embodiments of the present invention are described below by way of Examples. However, the present invention is in no way restricted by these Examples.

EXAMPLE 1

Figure 1B:
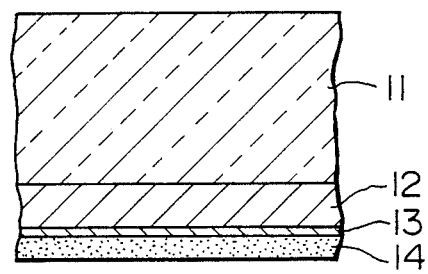
Figure 1C:
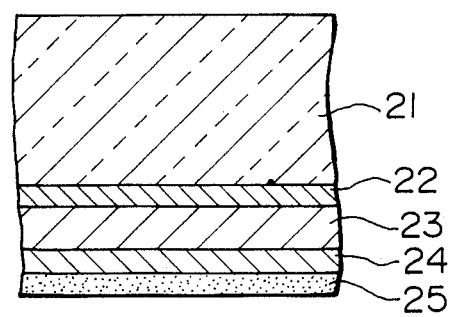
Figure 2:
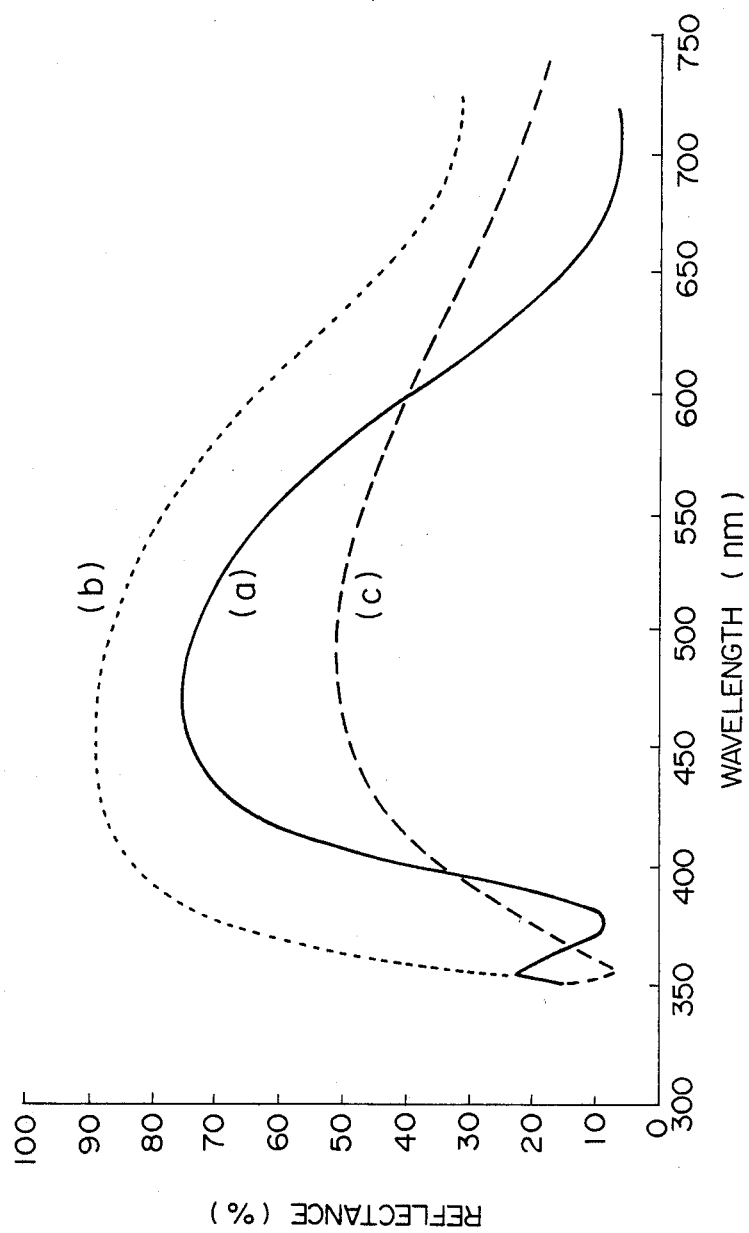
FIG. 2 shows the spectral reflection characteristics of conventional multi-layered back reflecting mirrors.
Figure 4:
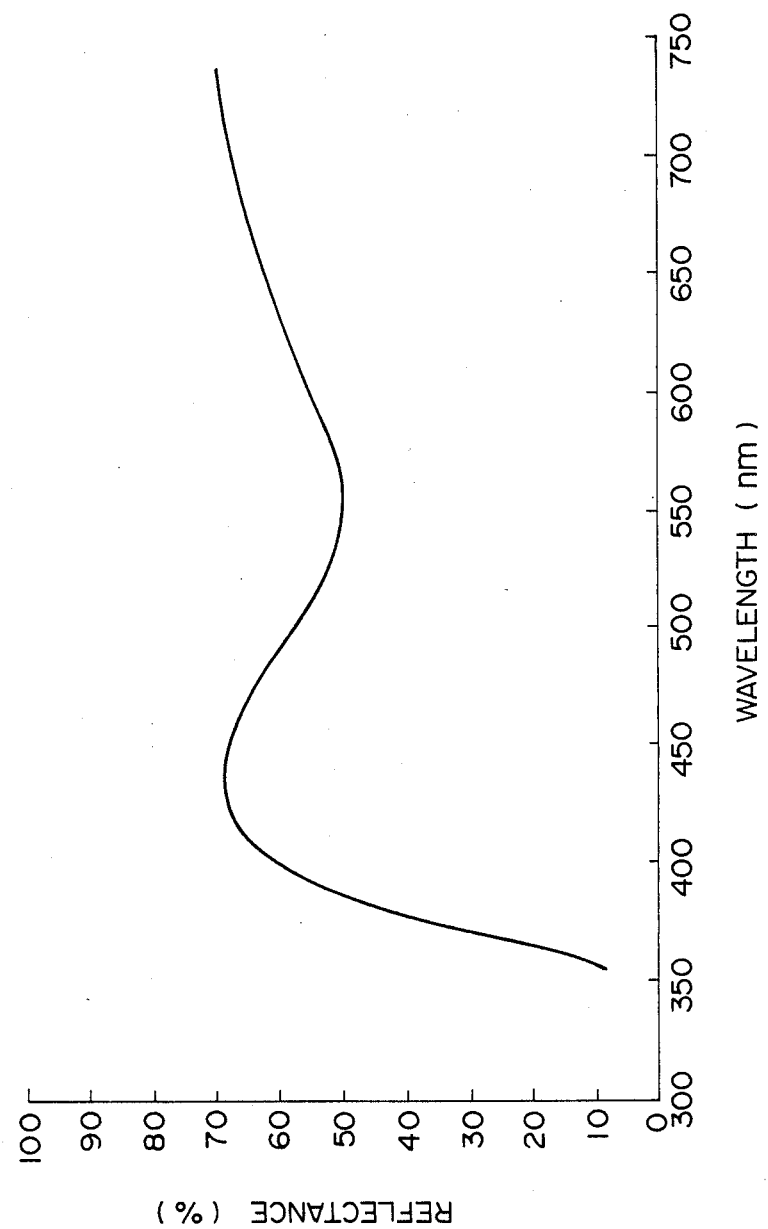
FIGS. 4, 5, 6, 7 and 8 each show the spectral reflection characteristic of a multi-layered back reflecting mirror of the present invention.

FIG. 1 (A) shows on an enlarged scale the sectional view of the essential part of a multi-layered back reflecting mirror of the present invention. In FIG. 1 (A), 1 is a glass substrate; 2 is a high refractive index material layer (a 2H layer) having an optical thickness of $\lambda_0/2$ (in this Example, $\lambda_0$ (which is the wavelength of a light used as the reference measurement for design purposes) is 540 nm and accordingly $\lambda_0/2$ is 270 nm) and made of $TiO_2$ having a refractive index of 2.30; 3 is a low refractive index material layer (a L layer) having an optical thickness of $\lambda_0/4$ (135 nm) and made of $MgF_2$ having a refractive index of 1.38; and 4 is a Cr film. That is, in the multi-layered back reflecting mirror of this Example, there is formed, on one side of the glass substrate, a multi-layered film consisting of the 2H layer, the L layer and the Cr film in this order, with the 2H layer being closest to the glass substrate. The spectral reflection characteristic of this multi-layered back reflecting mirror is shown in FIG. 4. As is clear from FIG. 4, the multi-layered back reflecting mirror of this Example, as compared with the conventional multi-layered back reflecting mirrors, is superior in freedom from glare because it has a low reflectance at a wavelength region of 480–550 nm where the product of the spectral luminous efficiency for dark adaptation of the human eye and the spectral energy characteristic of an automobile headlight is high, and is superior in visibility because it has high reflectances at blue (430–480 nm) and red (580–700 nm) wavelength regions where the sensitivity of the human eye is low in terms of brightness.

EXAMPLE 2

FIG. 1 (B) shows on an enlarged scale the sectional view of the essential part of other multi-layered back reflecting mirror of the present invention. In FIG. 1 (B), 11 is a glass substrate; 12 is a high refractive index material layer (a 2H layer) having an optical thickness of $\lambda_0/2$ (in this Example, the $\lambda_0$ (which is the wavelength of a light used as the reference measurement for design purposes) is 600 nm and accordingly $\lambda_0/2$ is 300 nm) and made of $TiO_2$ having a refractive index of 2.30; 3 is a low refractive index material layer (a L/2 layer) having an optical thickness of $\lambda_0/8$ (75 nm) and made of $SiO_2$ having a refractive index of 1.46; and 14 is a Cr film. That is, in the multi-layered back reflecting mirror of this Example, there is formed, on one side of the glass substrate, a multi-layered film consisting of the 2H layer, the L/2 layer and the Cr film in this order, with the 2H layer being closest to the substrate.

Figure 5:
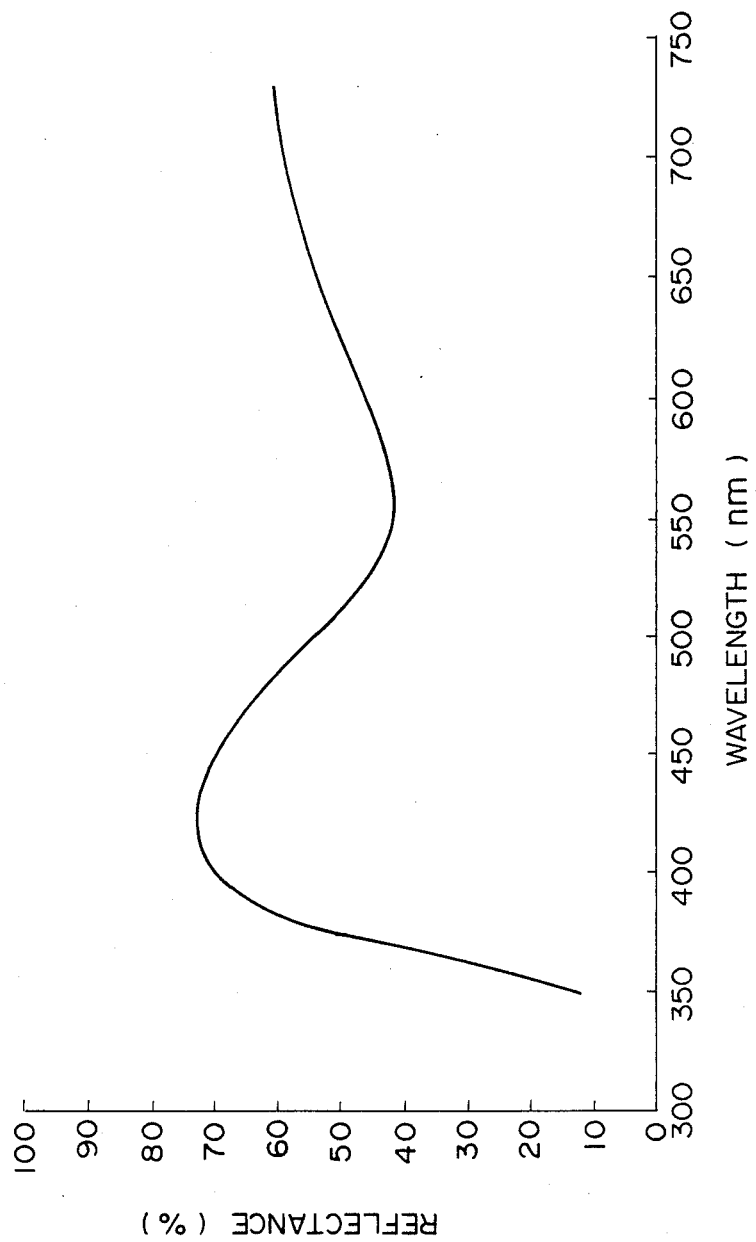

As is clear from FIG. 5, the multi-layered back reflecting mirror of this Example shows a spectral reflection characteristic similar to that of the multi-layered back reflecting mirror of Example 1 and accordingly is superior in freedom from glare and visibility.

EXAMPLE 3

FIG. 1 (C) shows on an enlarged scale the sectional view of the essential part of other multi-layered back reflecting mirror of the present invention. In FIG. 1 (C), 21 is a glass substrate; 22 is a low refractive index material layer (a $L_1$ layer) having an optical thickness of $\lambda_0/4$ (in this Example, the $\lambda_0$ (which is the wavelength of a light used as the reference measurement for design purposes) is 540 nm and accordingly $\lambda_0/4$ is 135 nm] and made of $SiO_2$ having a refractive index of 1.46; 23 is a high refractive index material layer (a 2H layer) having an optical thickness of $\lambda_0/2$ (270 nm) and made of $TiO_2$ having a refractive index of 2.30; 24 is a low refractive index material layer (a $L_2$ layer) having an optical thickness of $\lambda_0/4$ (135 nm) and made of $MgF_2$ having a refractive index of 1.38; and 25 is a Ge film. That is, in the multi-layered back reflecting mirror of this Example, there is formed, on one side of the glass substrate, a multi-layered film consisting of the $L_1$ layer, the 2H layer, the $L_2$ layer and the Ge film in this order, with the $L_1$ layer being closest to the substrate.

Figure 6:
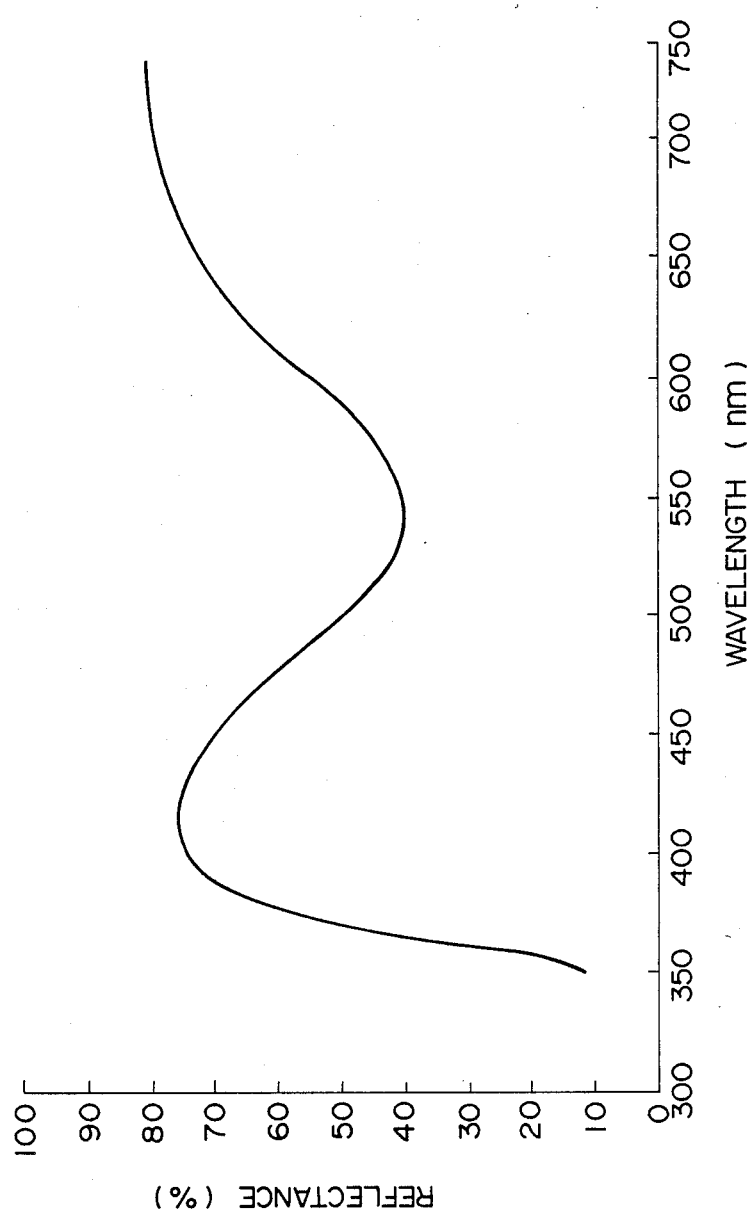

As is clear from FIG. 6, the multi-layered back reflecting mirror of this Example shows a spectral reflection characteristic similar to that of the multi-layered back reflecting mirror of Example 1 and accordingly is superior in freedom from glare and visibility.

EXAMPLE 4

FIG. 1 (D) shows on an enlarged scale the sectional view of the essential part of other multi-layered back reflecting mirror of the present invention. In FIG. 1 (D), 31 is a glass substrate; 32 is a high refractive index material layer (a $H_1$ layer) having an optical thickness of $\lambda_0/4$ (in this Example, the $\lambda_0$ (which is the wavelength of a light used as the reference measurement for design purposes) is 540 nm and accordingly $\lambda_0/4$ is 135 nm) and made of $TiO_2$ having a refractive index of 2.30; 33 is a high refractive index material layer (a $H_2$ layer) having an optical thickness of $\lambda_0/4$ (135 nm) and made of $ZrO_2$ having a refractive index of 2.05; 34 is a low refractive index material layer (a L layer) having an optical thickness of $\lambda_0/4$ (135 nm) and made of $SiO_2$ having a refractive index of 1.46; and 35 is a Cr film. That is, in the multi-layered back reflecting mirror of this Example, there is formed, on one side of the glass substrate, a multi-layered film consisting of the $H_1$ layer, the $H_2$ layer, the L layer and the Cr film in this order, with the $H_1$ layer being closest to the substrate (a high refractive index film layer, i.e. a 2H layer having an optical thickness of $\lambda_0/2$ is formed by the $H_1$ layer and the $H_2$ layer).

Figure 7:
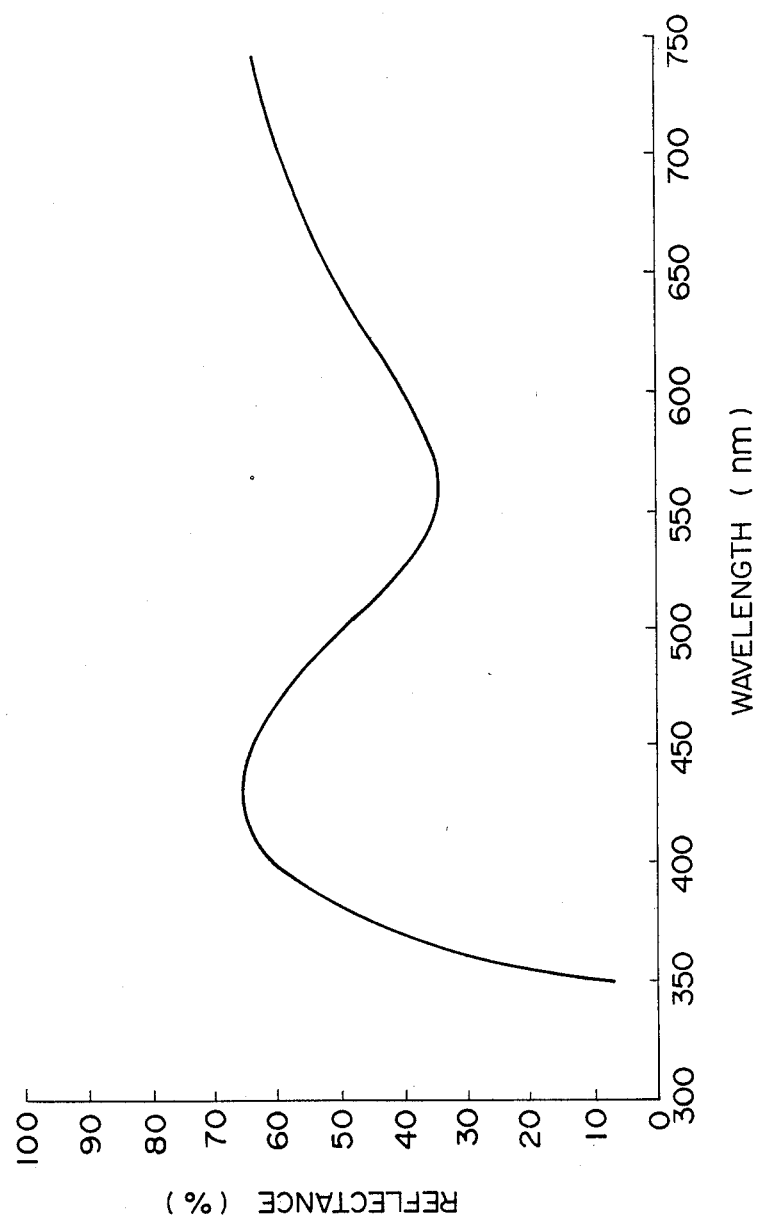

As is clear from FIG. 7, the multi-layered back reflecting mirror of this Example shows a spectral reflection characteristic similar to that of the multi-layered back reflecting mirror of Example 1 and accordingly is superior in freedom from glare and visibility.

EXAMPLE 5

FIG. 1 (E) shows on an enlarged scale the sectional view of the essential part of other multi-layered back reflecting mirror of the present invention. In FIG. 1 (E), 41 is a glass substrate; 42 is a low refractive index material layer (a $L_1$ layer) having an optical thickness of $\lambda_0/4$ (in this Example, the $\lambda_0$ (which is the wavelength of a light used as the reference measurement for design purposes) is 600 nm and accordingly $\lambda_0/4$ is 150 nm) and made of $SiO_2$ having a refractive index of 1.46; 43 is a high refractive index material layer (a $H_1$ layer) having an optical thickness of $\lambda_0/4$ (150 nm) and made of $TiO_2$ having a refractive index of 2.30; 44 is a high refractive index material layer (a $H_2$ layer) having an optical thickness of $\lambda_0/4$ (150 nm) and made of $ZrO_2$ having a refractive index of 2.05; 45 is a low refractive index material layer (a $L_2/2$ layer) having an optical thickness of $\lambda_0/8$ (75 nm) and made of $MgF_2$ having a refractive index of 1.38; and 46 is a Cr film. That is, in the multi-layered back reflecting mirror of this Example, there is formed, on one side of the glass substrate, a multi-layered film consisting of the $L_1$ layer, the $H_1$ layer, the $H_2$ layer, the $L_2/2$ layer and the Cr film in this order, with the $L_1$ layer being closest to the substrate (a high refractive index film layer, i.e. a 2H layer having an optical thickness of $\lambda_0/2$ is formed by the $H_1$ layer and the $H_2$ layer).

Figure 8:
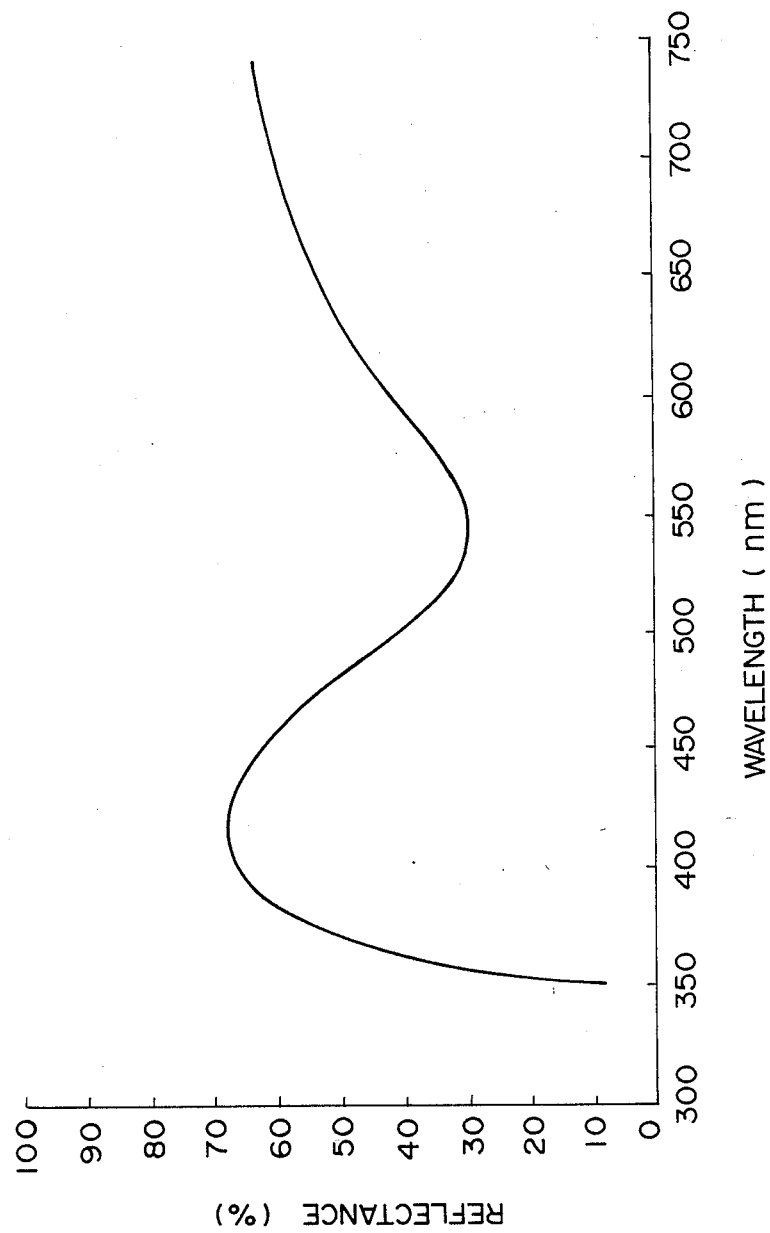

As is clear from FIG. 8, the multi-layered back reflecting mirror of this Example shows a spectral reflection characteristic similar to that of the multi-layered back reflecting mirror of Example 1 and accordingly is superior in freedom from glare and visibility.

As is clear from FIGS. 4–8, the multi-layered back reflecting mirrors of Examples 1–5 have an additional advantage of suppressing the reflection of unwanted and deleterious ultraviolet light.

In the above Examples 1–5, various multi-layered back reflecting mirrors of the present invention have been explained. The same spectral reflection characteristic can be obtained when in each of Examples 1—3 the 2H layer of the dielectric multi-layered film is replaced with a $H_1$ layer/a $H_2$ layer or a $H_2$ layer/a $H_1$ layer. Also, the same spectral reflection characteristic can be obtained when in each of Examples 4 and 5 the $H_1$ layer/the $H_2$ layer of the dielectric multi-layered film is replaced with the $H_2$ layer/the $H_1$ layer (the order of the $H_1$ layer and the $H_2$ layer is reversed).

The same spectral reflection characteristic can be obtained when in each of Examples 1–5 each layer of the dielectric multi-layered film is replaced with an equivalent film.

An equivalent spectral reflection characteristic can be obtained when the glass substrate is replaced with a plastic substrate.

A back reflecting mirror has such a nature that it provides not only the light flux that is reflected from its back side to construct a desired image but also a reflection from the front side that is unnecessary for constructing this image. In the case of vertical incidence, about 4% of the incident light will be reflected from the front side of the mirror. In order to eliminate the occurrence of such unwanted reflection, it may be effective to provide an anti-reflection film on the front side of the multi-layered back reflecting mirror of the present invention.

The multi-layered back reflecting mirror of the present invention has the following technical advantages.

(1) The mirror has a great degree of freedom from glare.

Figure 3:
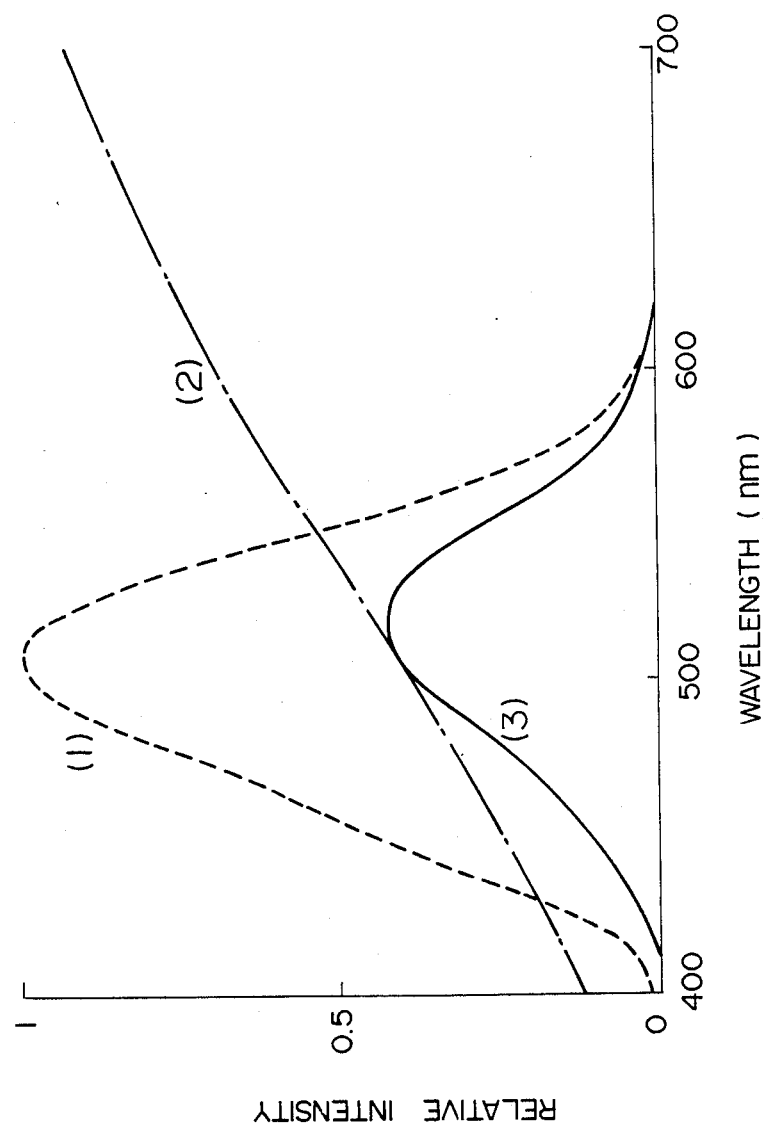
FIG. 3 shows the spectral luminous efficiency for dark adaptation of the human eye, the spectral energy characteristic of an automobile headlight (halogen lamp), and the product of these two parameters, namely, the spectral energy characteristic of an automobile headlight as perceived by the human eye.

The reflecting mirror of the present invention has, as is clear from FIGS. 4–8, a low reflectance in a wavelength region of 480–550 nm where the P $(\lambda) \times V'(\lambda)$ has a high value as seen in the curve (3) of FIG. 3. Accordingly, the reflecting mirror of the present invention has a great degree of freedom from glare.

(2) The mirror has a superior visibility.

As is shown in FIGS. 4–8, the reflecting mirror of the present invention has a low reflectance in a wavelength region where freedom from glare is required, and has a high reflectance in other wavelength regions. Therefore, a superior visibility is ensured in the reflecting mirror of the present invention.

The reflecting mirror of the present invention has an additional advantage of improved color distinguishability (improved color contrast) because the reflecting mirror is so designed that it has a lower reflectance in the green (490–580 nm) region (where a greater visual sensation occurs in terms of brightness) than in blue (400~480 nm) and red (590–700 nm) regions, thereby sensitizing these low-brightness colors.

(3) The mirror is superior in decorative and fashion aspects.

As a result of the aforementioned accomplishments in improving the degree of freedom from glare and the level of visibility, the reflecting mirror of the present invention produces a reflected light having a somewhat magenta hue. This magenta hue imparts a feeling of high quality to the mirror, thereby enabling it to be clearly differentiated from other reflecting mirrors on the market.

(4) The mirror is superior in productivity and cost.

The reflecting mirror of the present invention has such advantages in its production that the number of layers of the dielectric multi-layered film to be formed is small and moreover the dielectric multi-layered film and the metal or semiconductor film can be formed by the same method. Therefore, the reflecting mirror is superior in productivity and cost, unlike the reflecting mirror disclosed in Japanese Patent Application Kokai (Laid-Open) No. 74005/1985 wherein the number of layers of the dielectric multi-layered film to be formed is large and moreover there are required coating and baking in the formation of the light-absorbing film.

Thus, according to the present invention there is provided a multi-layered back reflecting mirror having various advantages in freedom from glare, visibility, decorative aspect, elimination of deleterious light, etc. in spite of the small number of layers in the dielectric multi-layered film.

What is claimed is:

1. A multi-layered back reflecting mirror comprising a substrate, a dielectric multi-layered film formed on one side of the substrate and a metal or semiconductor film formed on the dielectric multi-layered film, the dielectric multi-layered film comprising at least one high refractive index material layer having an optical thickness of $\lambda_0/2$ ($\lambda_0$ is the wavelength of a light used as the reference measurement for design purposes) and at least one low refractive index material layer having an optical thickness of 0.05–0.4$\lambda_0$, the high refractive index material layer existing closer to the substrate relative to the low refractive index material layer, and the low refractive index material layer existing closer to the metal or semiconductor film relative to the high refractive index material layer.

2. A multi-layered back reflecting mirror according to claim 1, wherein the high refractive index material layer is made of a high refractive index material having a refractive index of 1.9–2.4.

3. A multi-layered back reflecting mirror according to claim 2, wherein the high refractive index material is at least one member selected from the group consisting of SiO, $TiO_2$, $Ta_2O_5$, $ZrO_2$, $HfO_2$ and ZnS.

4. A multi-layered back reflecting mirror according to claim 1, wherein the low refractive index material layer is made of a low refractive index material having a refractive index of 1.3–1.8.

5. A multi-layered back reflecting mirror according to claim 4, wherein the low refractive index material is at least one member selected from the group consisting of $SiO_2$, $Al_2O_3$, $MgF_2$ and $CeF_3$.

6. A multi-layered back reflecting mirror according to claim 1, wherein the high refractive index material layer is made of $Al_2O_3$ and/or $CeF_3$ and the low refractive index material layer is made of a material having a lower refractive index than those of $Al_2O_3$ and $CeF_3$.

7. A multi-layered back reflecting mirror according to claim 1, wherein the optical thickness of the low refractive index material layer is $\lambda_0/8$ or $\lambda_0/4$.

8. A multi-layered back reflecting mirror according to claim 1, wherein the dielectric multi-layered film has another low refractive index material layer between the substrate and the high refractive index material layer.

9. A multi-layered back reflecting mirror according to claim 1, wherein the high refractive index material layer having an optical thickness of $\lambda_0/2$ consists of a high refractive index material layer having an optical thickness of $\lambda_0/4$ and another high refractive index material layer having an optical thickness of $\lambda_0/4$ and provided adjacent thereto.

10. A multi-layered back reflecting mirror according to claim 1, wherein the metal or semiconductor film has a reflectance of 30% or more.

11. A multi-layered back reflecting mirror according to claim 10, wherein the metal or semiconductor film is made of a single metal or semiconductor selected from the group consisting of Cr, Ni, Al, Ag, Co, Fe, Si and Ge.

12. A multi-layered back reflecting mirror according to claim 10, wherein the metal or semiconductor film is made of an alloy containing at least one metal or semiconductor selected from the group consisting of Cr, Ni, Al, Ag, Co, Fe, Si and Ge.

* * * * *